E. W. WILSON.
STEERING MECHANISM FOR AUTOMOBILES.
APPLICATION FILED OCT. 7, 1916.
1,264,587.
Patented Apr. 30, 1918.
3 SHEETS—SHEET 1.
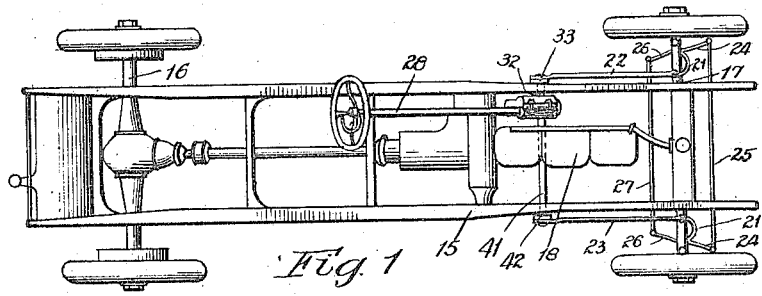
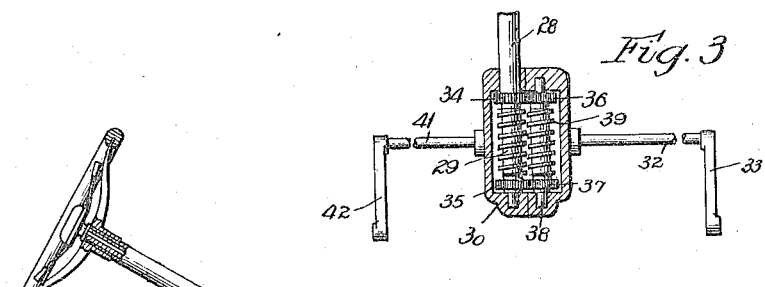
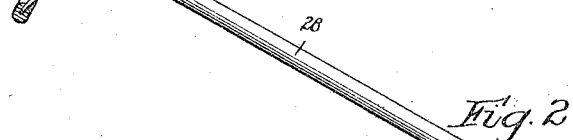
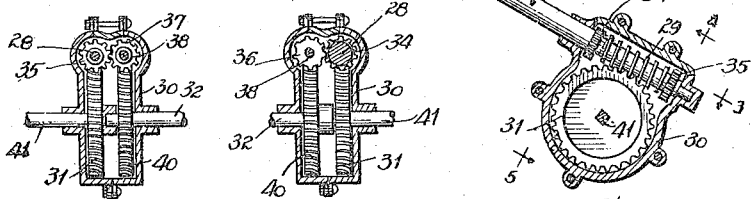
Witnesses:
Albin C. Ahlberg
Robert F. Brach
Inventor
Edwin W. Wilson
By Williams, Bradbury & Lee
Attorneys

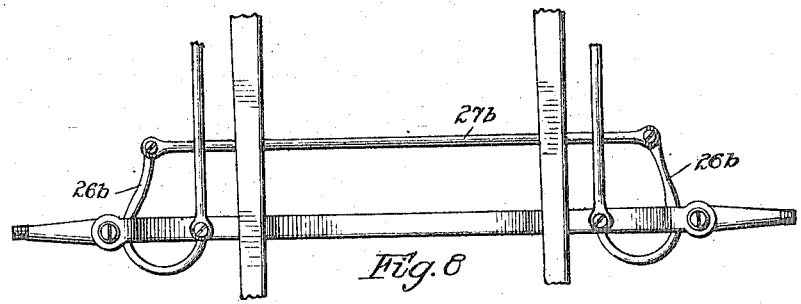
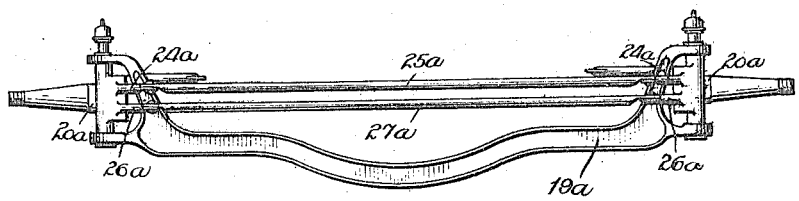
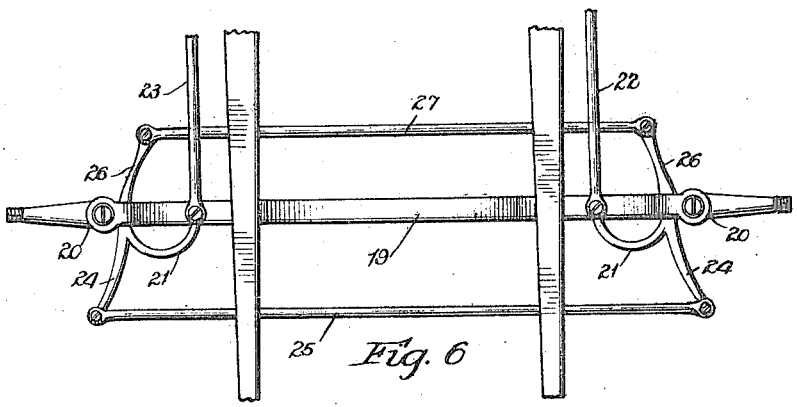

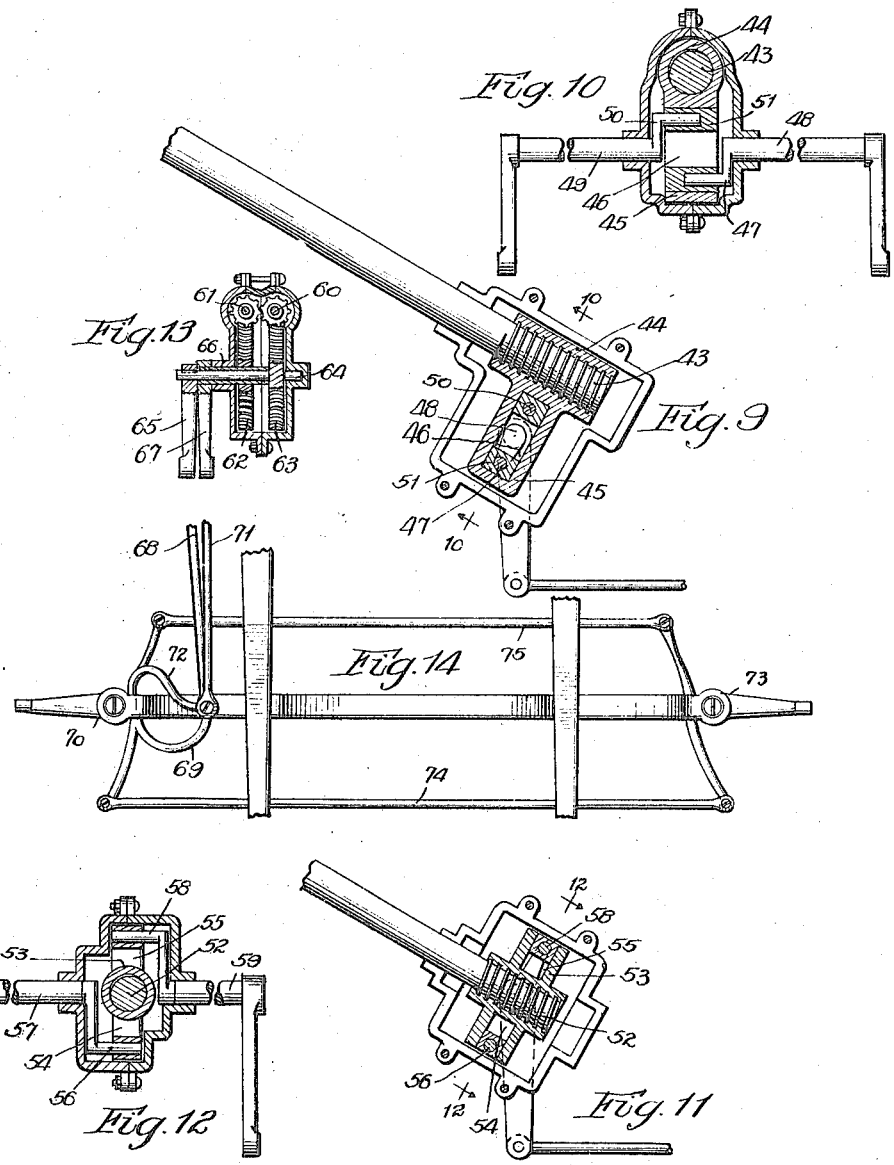

UNITED STATES PATENT OFFICE.

EDWIN W. WILSON, OF CHICAGO, ILLINOIS.

STEERING MECHANISM FOR AUTOMOBILES.

1,264,587.     Specification of Letters Patent.     Patented Apr. 30, 1918.

Application filed October 7, 1916. Serial No. 124,254.

*To all whom it may concern:*

Be it known that I, EDWIN W. WILSON, a citizen of the United States, residing at Chicago, in the county of Cook and State of Illinois, have invented certain new and useful Improvements in Steering Mechanism for Automobiles, of which the following is a full, clear, concise, and exact description, reference being had to the accompanying drawings, forming a part of this specification.

My invention relates to steering mechanism for vehicles and has particular utility when employed in automobile construction, wherein a fixed front axle is provided which axle has pivotally connected with each end a steering knuckle.

It has been the practice to connect the steering knuckles together by means of a drag link to cause simultaneous movement thereof and to connect one of the steering knuckles through suitable linkage with the steering column. In such construction the linkage extending between the steering knuckle and the steering column undertakes a great deal of responsibility, for should the linkage for any reason become inoperative the vehicle is permitted to leave the control of the operator.

It is the object of the present invention to provide a plurality of linkage systems extending between and connecting the steering column and the steering knuckles, so that if any one of the linkage systems is rendered inoperative the vehicle is still maintained under the control of the operator through the remaining linkage system or systems which are in operating condition.

These and other objects of my invention will be more clearly brought out in connection with the accompanying drawings, wherein—

Figure 1 is a plan view of the mechanism of my invention, mounted on the framework of an automobile;

Fig. 2 is a detail side elevational view of the steering column, some of the parts being broken away to more clearly illustrate the interior construction;

Fig. 3 is a cross sectional view taken along the line 3—3 of Fig. 2 and looking in the direction indicated by the arrows;

Fig. 4 is a cross sectional view taken along the line 4—4 of Fig. 2 and looking in the direction indicated by the arrows;

Fig. 5 is a cross sectional view taken along the line 5—5 of Fig. 2 and looking in the direction indicated by the arrows;

Fig. 6 is an enlarged view of the fixed front axle and its associated steering mechanism illustrated in Fig. 1;

Fig. 7 is a rear elevational view of a fixed front axle and steering mechanism, wherein a pair of drag links are positioned on one side of the fixed axle;

Fig. 8 is another modified form wherein only one drag link is provided, as distinguished from Fig. 6, wherein two drag links are utilized;

Fig. 9 is a view similar to Fig. 2 of a modified form of steering column;

Fig. 10 is a cross sectional view taken along the line 10—10 of Fig. 9 and looking in the direction indicated by the arrows;

Fig. 11 is a view similar to Fig. 9 of another modified form of steering column;

Fig. 12 is a cross sectional view taken along the line 12—12 of Fig. 11, looking in the direction indicated by the arrows;

Fig. 13 is a view similar to Fig. 5 of another modified form of steering column, and Fig. 14 is a plan view of the linkage systems employed in connection with the steering mechanism illustrated in Fig. 13.

Similar characters of reference refer to similar parts throughout the several views.

Referring first to Fig. 1, 15 illustrates the framework or chassis of an automobile carrying the rear axle 16 and the fixed front axle 17. The internal combustion engine is illustrated at 18 which is operatively connected with the rear axle 16 in any well known manner. The front axle 17 which is illustrated in detail in Fig. 6 consists of the fixed axle section 19 attached to the framework of the automobile and pivotally supporting at each end a steering knuckle 20. Each one of the steering knuckles 20 is provided with the arm 21, one of which is connected with the connecting rod 22 and the other with the connecting rod 23, extending rearwardly toward the steering post. Attached to and extending forwardly from each one of the steering knuckles is an arm 24, both of which are connected together by means of the drag link shown at 25. The steering knuckles also contain the arms 26 operatively connected together by means of the second drag link 27.

The steering post is illustrated at 28 which terminates at its lower end in a worm 29 (Fig. 2). The worm 29 is contained within the casing 30 and is adapted to mesh with the worm gear 31, in turn rigidly fixed to the shaft 32. Attached to the outer end of the shaft 32 is an arm 33 in turn connected with the connecting rod 22. Mounted in alinement with the worm 29 and arranged to rotate therewith is a pair of pinions 34 and 35 arranged to mesh respectively with the pinions 36 and 37 mounted on the shaft 38 running parallel with the worm 29. The shaft 38 contains a worm 39 similar in all respects to the worm 29 and is arranged to mesh with a worm gear 40 connected with the shaft 41. The outer end of the shaft 41 carries the arm 42, the lower end of which is pivotally connected with the connecting rod 23. The pinions 34, 36, 35 and 38 are arranged so that as the teeth of the pinions 34 and 36 are fully in mesh the teeth of the pinions 35 and 37 are not fully in mesh, so that any lost motion between the two worms is prevented.

From the description thus far given it will be seen that upon rotation of the steering column the worm wheels 31 and 40 are rotated in opposite directions with the result that the connecting rods 22 and 23 are moved in opposite directions to effect turning of the steering knuckles 20—20 and thus the vehicle. If now for any reason any of the mechanism coöperating with the connecting rod 22 becomes inoperative the operator is still enabled to control the steering mechanism through the remaining linkage system of which the connecting rod 23 forms a part. Similarly if the drag link 25 is broken or disconnected, the steering mechanism may be operated satisfactorily. It should also be noted that steering of the vehicle may be accomplished even though both of the drag links are disconnected or if one of the drag links and one of the linkage systems extending between each of the steering knuckles and the steering column are rendered inoperative.

In Fig. 7 the fixed front axle is shown at 19ª and the steering knuckles at 20ª—20ª, each pivotally mounted on one end of the fixed axle. The arms 24ª—24ª and 26ª—26ª are positioned on one side on the fixed axle 19ª as distinguished from the construction shown in Fig. 6, wherein the drag links are positioned one on each side of the fixed axle. The arms 24ª are connected together by means of the drag link 25ª and the arms 26ª by virtue of the drag link 27ª.

In the construction shown in Fig. 8 one of the drag links is dispensed with and the one employed positioned on the inside of the fixed axle, as shown at 27ᵇ, connected with the arms 26ᵇ—26ᵇ.

In the modified form of steering column illustrated in Fig. 9 the steering column is provided with the worm 43 extending into and meshing with the nut 44 arranged when the steering column is rotated to move longitudinally relative to the worm. One side of the nut 44, preferably the underside, is provided with an extension 45 containing a slot 46, into which is arranged to extend a crank arm 47 forming part of the shaft 48, which shaft corresponds with the shaft 41 illustrated in Fig. 1. The shaft 48 has its axis extending through the center portion of slot 46 and mounted in alinement with the shaft 48 is a second shaft 49 corresponding with the shaft 42, illustrated in Fig. 1, which shaft contains the crank arm 50 extending into the slot 46, and at the end of the slot opposite the crank arm 47. Bearing blocks may be provided, as shown at 51, for each one of the crank arms 47 and 50. In the operation of the device illustrated in Figs. 9 and 10 the steering column is rotated, thus imparting to the nut 44 a longitudinal movement relative to the column. If, say, the nut 44 is moved upwardly the shaft 48 will be given a clockwise rotation, whereas the shaft 49 upon such movement will be given a counterclockwise rotation (Fig. 9).

In the modified form illustrated in Figs. 11 and 12, the steering post contains the worm 52 extending into and meshing with the nut 53 which contains two slots 54 and 55, one positioned above the worm and one below the worm. The slot 54 has extending into it the crank arm 56 forming part of the shaft 57 corresponding with the shaft 41 of Fig. 1. The shaft 57, as illustrated in Fig. 11, is mounted so that its axis extends through the axis of the worm 52. The slot 55 has extending into it the crank arm 58 forming part of the shaft 59 corresponding with the shaft 32 illustrated in Fig. 1. This shaft 59 is mounted as illustrated in Fig. 12 on the side of the worm 52 opposite the shaft 57 and is disposed in axial alinement with the shaft 57. If upon turning of the worm 52 the nut 53 is caused to move, say, upwardly, the shaft 59 will be given a clockwise rotation and the shaft 57 a counterclockwise rotation. The outer ends of the shafts 57 and 59 are connected, as are the shafts 32 and 41 of Fig. 1, with the connecting rods extending to the steering knuckles.

In all the constructions thus far described the connecting rods are positioned one on each side of the vehicle framework, thus necessitating an operating shaft as illustrated at 32 in Fig. 1, which extends through the casing of the internal combustion engine shown at 18. To avoid the necessity of extending one of these operating shafts through the engine casing the construction shown in Figs. 13 and 14 may be employed. In this construction the two operating shafts extend from the steering column to only one side of the chassis and are there connected with only one of the steering knuckles. In Fig. 13, 60 illustrates the steering post upon which is mounted a worm and a pair of pinions similar to the construction illustrated in Fig. 2, the pinions meshing with a second pair of pinions mounted on the shaft 61 which shaft also carries a worm. The worms carried by the steering post 60 and the shaft 61 are arranged in opposite directions so that upon rotation of the steering post 60 the worm wheels 62 and 63, which mesh with the worms, are driven simultaneously in the same direction. The worm wheel 63 is rigidly attached to the shaft 64 terminating in the arm 65. The worm wheel 62 is attached to the sleeve 66 extending around the shaft 64 and which has attached thereto at its outer end the arm 67. The arm 65 has its lower end attached to the connecting rod 68 in turn connected with the arm 69 extending from the steering knuckle 70. The arm 67 has its lower end attached to the connecting rod 71, which in turn is connected with the arm 72 also extending from the steering knuckle 70. The steering knuckles 70 and 73 are connected together through the drag links 74 and 75. It will thus be seen that there are two separate and distinct linkage systems connecting and extending between the steering axle and the steering column, and that if one of the connections is broken the remaining system may be utilized to steer the vehicle.

What I claim as new and desire to secure by Letters Patent of the United States, is:

1. Steering mechanism for automobiles comprising a pair of parallel shafts, a worm carried by each of said shafts, a pinion carried by each shaft, said pinions meshing with each other, a pair of worm wheels each meshing with one of said worms, a steering column for operating one of said shafts, a steering axle, and a pair of linkage systems each connecting and extending between one of said worm wheels and the steering axle.

2. Steering mechanism for automobiles comprising a pair of parallel shafts, a worm carried by each of said shafts, a pair of pinions carried by each shaft, said pinions meshing with each other, a pair of worm wheels each meshing with one of said worms, a steering column for operating one of said shafts, a front axle, and a pair of linkage systems each connecting and extending between one of said worm wheels and the front axle.

3. A steering mechanism comprising a steering post, a parallel shaft connected with said post, a worm carried by both the steering post and shaft, a worm gear meshing with each of said worms, a fixed front axle, steering knuckles pivotally mounted on each end of said axle, drag links connecting said steering knuckles, and a linkage system connected between said worm gears and steering knuckles.

4. In a vehicle steering mechanism the provision of two parallel shafts each carrying pinions meshing with each other, a worm carried by each of said shafts, a pair of worm gears arranged to mesh with said worms, a steering post connecting with one of said shafts, a front axle, a linkage system consisting of a laterally extending shaft directly connected to each of said worm gears, and forwardly extending rods operatively connected between the last mentioned shaft and the front axle.

In witness whereof, I hereunto subscribe my name this 3rd day of October, A. D. 1916.

EDWIN W. WILSON.

Witnesses:
 ROBERT F. BRACKE,
 ALBIN C. AHLBERG.

Copies of this patent may be obtained for five cents each, by addressing the "Commissioner of Patents, Washington, D. C."